United States Patent [19]

Waring

[11] 3,912,435
[45] Oct. 14, 1975

[54] BLOW MOLDING APPARATUS

[75] Inventor: Donald A. Waring, Overland Park, Kans.

[73] Assignee: Ethyl Development Corporation, Kansas City, Mo.

[22] Filed: May 6, 1174

[21] Appl. No.: 467,262

[52] U.S. Cl. .................... 425/326 B; 425/DIG. 206
[51] Int. Cl.² ....................... B29C 1/00; B29C 7/00
[58] Field of Search .... 425/387 B, 289, 292, 302 R, 425/302 B, DIG. 806; 225/1; 264/94, 95, 96, 98

[56] References Cited
UNITED STATES PATENTS

| | | | |
|---|---|---|---|
| 2,890,483 | 6/1959 | Soubier | 425/806 |
| 3,593,374 | 7/1971 | Sierd et al. | 425/806 |
| 3,795,530 | 3/1974 | Kontz et al. | 425/302 B |

Primary Examiner—Francis S. Husar
Assistant Examiner—Robert J. Charvat
Attorney, Agent, or Firm—Donald L. Johnson; John F. Sieberth; Edgar E. Spielman, Jr.

[57] ABSTRACT

An apparatus for blow molding hollow, plastic articles to provide a finished base in the molding step is disclosed. A plastic parison is received between separable mold halves, each mold half having a top mold component and a bottom mold component. The bottom mold component is additionally movable along the center axis of the article. Also provided is a tail-gripping assembly which is also movable along the center axis of the article and which grips the tail of the parison when the mold halves are in the closed position. The tail-gripping assembly is connected to a power source to provide such axial movement. Engaging means are provided for the tail-gripping means to engage the bottom mold component during movement of the former to impart movement to the latter while the mold halves are in a closed position. When the mold halves are closed the tail-gripping assembly grips the tail of the parison and then moves downwardly to separate the tail from the article and to also engage the bottom mold component. The engaged bottom mold components are pulled away from the article. Upon opening of the mold halves the tailless article is free to fall from the mold as the bottom mold component has been pulled away from the article thus removing bottom support therefor.

9 Claims, 8 Drawing Figures

BLOW MOLDING APPARATUS

BACKGROUND OF THE INVENTION

This invention relates to an apparatus for blow molding plastic articles with a finished base.

In the blow molding of plastic bottles, it has long been an objective to produce a bottle with a completely finished base in the blowing step. Earlier methods and apparatuses for producing bottles from tubular parisons have not been completely effective in the removal of the tail from the bottle subsequent to the blowing step. It is often necessary to subject the bottle to a secondary finishing operation to completely finish the base of the bottle. A number of methods and apparatuses have been proposed for severing the tail from the bottle. In U.S. Pat. No. 2,994,103 there is disclosed an apparatus that removed the waste portion from the blown plastic article while the article is supported by the mold. However, to initiate the removal process, the mold must be partially opened. This step requires additional time and results in lower output. The apparatuses described in U.S. Pat. Nos. 3,098,593; 3,172,152; 3,351,981; 3,465,931; and 3,486,190 all require that the article be removed from the mold to a waste removal station. The articles are removed to the waste removal station by a variety of methods, none of which utilize grasping the waste portion. U.S. Pat. Nos. 3,040,376; 3,266,083; 3,417,428; 3,464,084; and 3,506,171 also require that the article be removed from the mold and taken to a waste removal station. However, these patents do make use of the waste portion by engaging the waste to remove the article to the station. All of the abovementioned patents require either that the article be removed from the mold before removing the waste or that the mold be partially opened before the waste is removed.

Another problem encountered by those in the blow molding art is the problem of removing the hollow-formed article from the mold halves when the article has a concave bottom. Such a bottom is usually formed in bottles which are to hold materials which will exert a pressure on the walls of the bottle. When such bottles are formed the bottom-forming portion tends to hold the bottle in the mold even though the mold halves are opened. Special apparatuses and time-consuming procedures are then required to remove the bottle.

Thus it is an object of this invention to provide a blow molding apparatus which has a tail-pulling capability while the mold halves are in the closed position and which facilitates the removal of the finished article from the mold halves when the mold halves are in the open position.

THE INVENTION

This invention relates to an apparatus for blow molding hollow, plastic articles from tubular plastic parisons which includes: a split blow mold having two halves, each half having a top mold component and a bottom mold component, said bottom mold component being movable along the center axis of said article; two individual mold support means for holding each individual mold half; power means to move each individual support means and each associated mold half in a direction substantially perpendicular to said center axis whereby said separate mold can be opened and closed; tail-gripping means having two opposed halves, each half being held by one of said mold support means and said tail-gripping means being movable along the center axis of said article; cooperating engaging means on said tail-gripping means and on said bottom mold component halves; and second power means coupled to said tail-gripping means to first move said tail-gripping means along said center axis and subsequently to move said tail-gripping means into engagement with said bottom mold component halves to move said mold component halves along said center axis whereby a tail is removed from said article by said first movement and whereby said subsequent movement facilitates removal of said article from said mold halves when said mold is opened.

A preferred form of the apparatus of this invention is one in which the tail-gripping means is generally L-shaped. On the outside face of the vertical leg of the tail-gripping means is a serrated gripping surface. The horizontal leg is attached to the second power means. The inside face of the vertical leg has a protuberance which is slidable up and down a channel in the bottom mold component halves. When, in this preferred embodiment, the protuberances reach the upper or lower ends of the channels the tail-gripper engages the bottom mold component and causes it to move in the same direction as the tail-gripper.

Some of the advantages of the apparatus of the present invention include the ability to completely form a finished base on the hollow article within the mold during the blowing step without leaving any waste plastic moil which must be subsequently removed after the bottle is blown. The apparatus provides a simple mechanical arrangement for producing a finished base on a container during the blowing step and thereby eliminates the need for elaborate mechanisms for opening the mold, moving the article to another station for tail removal and pulling the tail. Also, the blown article can be cooling while the tail is being pulled since the mold halves are not opened. Further, by having the tail removed while the container is being blown, production can be increased since additional steps are not required for finishing the hollow article. Another important advantage of the apparatus of this invention is that by providing a downwardly movable bottom mold component the removal of bottles having a concave bottom from the mold is facilitated as the bottom support for the bottle is removed when the movable mold component is moved away from the bottle.

These and other features of the invention contributing satisfaction in use and economy in manufacture will be more fully understood from the following description of preferred embodiments of the invention when taken in connection with the accompanying drawings wherein identical numerals refer to identical parts and in which FIG. 1 is a top plan view of a blow molding apparatus of this invention;

Figure 1:
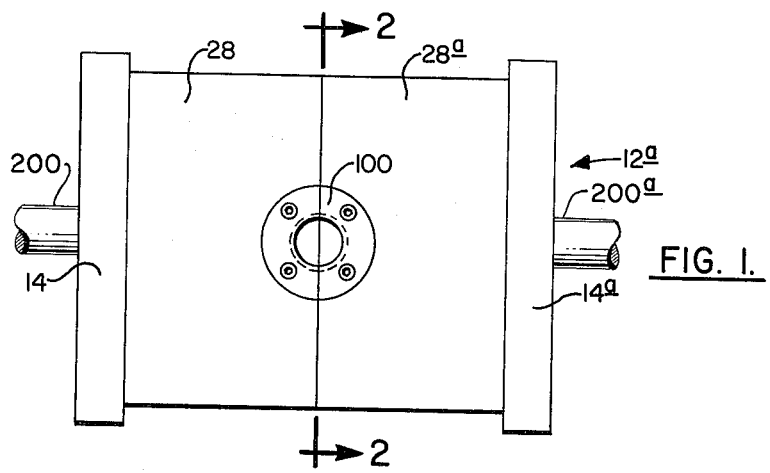
Figure 2:
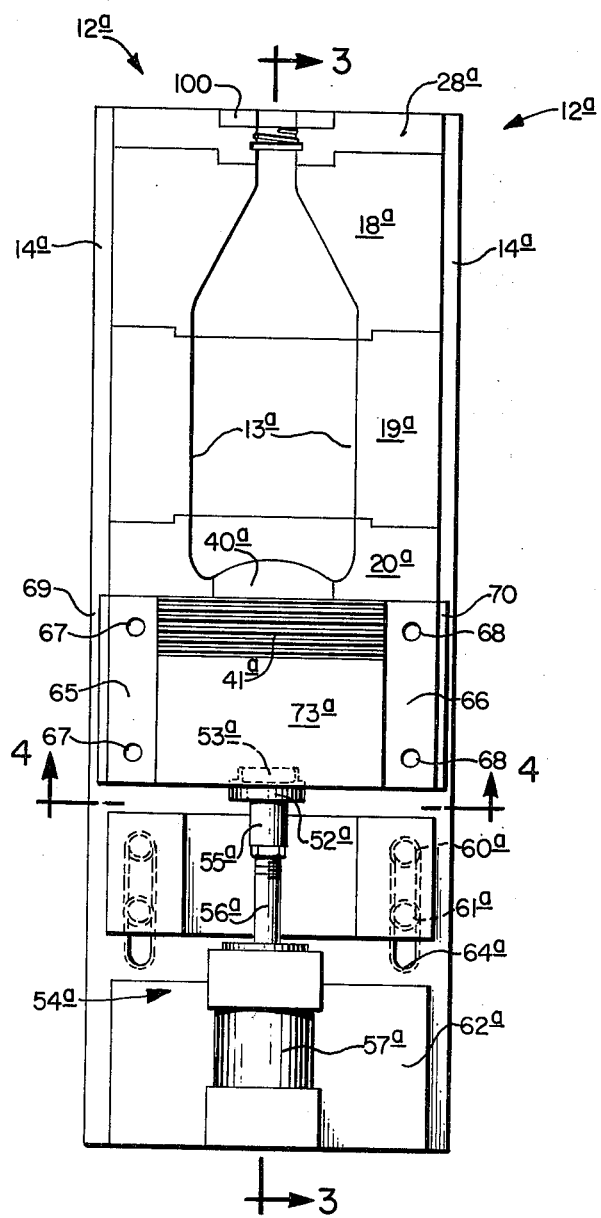
FIG. 2 is an elevational view of one of the mold halves shown in FIG. 1 viewed along line 2—2.
Figure 3:
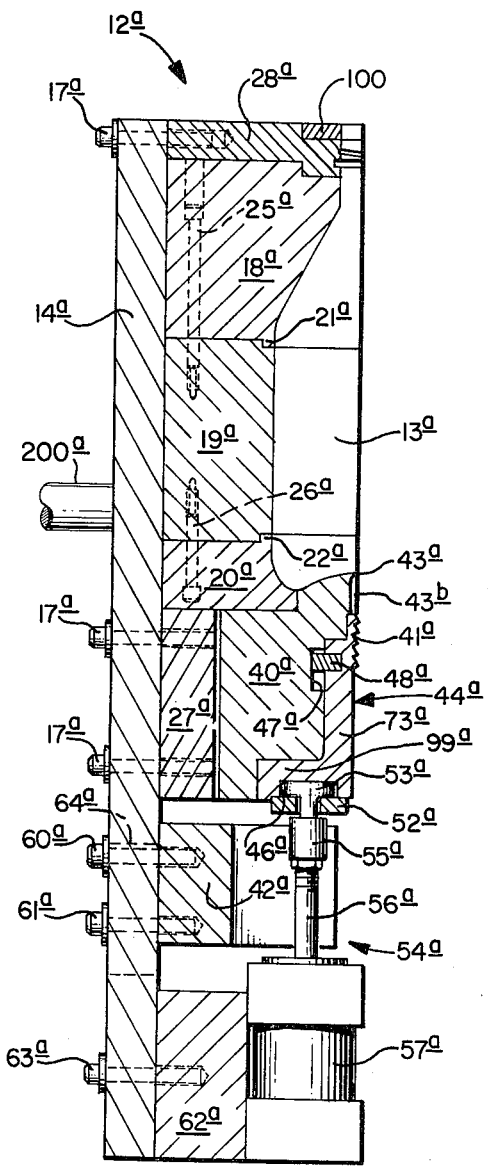
FIG. 3 is a partial sectional view taken along line 3—3 of FIG. 2.

Referring now to FIGS. 1–4, there is shown one embodiment for a blow molding apparatus having the features of the present invention. FIG. 1 shows both halves of the apparatus of this invention as seen from a top view when the two halves are in a closed position. One-half of this apparatus generally designated by the numeral 12a is shown in FIGS. 2 and 3. For the sake of simplicity and since the two halves of the apparatus are identical, as can be seen in FIGS. 5–8, the apparatus half shown in FIGS. 2 and 3 only will be described.

As can be seen from FIGS. 2 and 3, mold sections 18a, 19a and 20a make up a top mold component while bottom mold section 40a makes up a bottom mold component. Bolts 25a and 26a interconnect mold sections 18a, 19a and 20a in rigid structure. Corners 21a and 22a also help maintain these mold sections in rigid arrangement. Holding these top mold components in position relative to side mold support 14a are top mold support 28a and bottom mold support 27a. Bottom mold support 27a also acts as a guide for bottom mold section 40a. The top and bottom mold supports 28a and 27a respectively are attached to side mold support 14a by means of bolts 17a. Movement of the mold halves in a direction substantially perpendicular to the center axis of the article to be blown will open and close the mold halves. This movement can be achieved by any number of ways known in the art. A preferred way is achieved by having push rods 200 and 200a attached to side mold supports 14 and 14a, respectively. Push rods 200 and 200a are powered by any power apparatus which will cause rods 200 and 200a to reciprocally move in a direction substantially perpendicular to the center axis of the article to be blown. A most satisfactory powering apparatus is a double acting pneumatic cylinder attached to each push rod. Other apparatus of course can be used.

Fitted into the outside surface of bottom mold section 40a is a tail-puller generally designated by the numeral 44a. This tail-puller is generally L-shaped with a vertical leg 73a and a horizontal leg 99a. On the upper portion of vertical leg 73a are serrated gripping edges 41a. On the inside surface of vertical leg 73a is protuberance 48a. Protuberance 48a fits within open channel 47a which is in bottom mold section 40a. As can be seen from FIG. 3, tail-puller 44a is accommodated within recesses in bottom mold section 40a.

Power supply and connecting assembly generally designated by the numeral 54a comprises a double reciprocating hydraulic cylinder 57a, connecting rod 56a, attachment adapter 55a and attaching key 53a. Attaching key 53a fits snugly into recess 46a in the bottom portion of horizontal leg 99a. Keeper 52a maintains key 53a in recess 46a. Maintaining cylinder 57a in position is maintenance block 62a which is connected to side mold support 14a by way of bolt 63a. Bottom mold stop 42a is adjustably connected to side mold support 14a by means of bolts 60a and 61a which are slidable upon loosening within adjustment slot 64a.

Bottom mold section 40a has on its upper inside surface a cup-like depression 43b which allows the parison tail to extend down to serrated edges 41a. To sever the tail, bottom mold section 40a has at the top of cup-like depression 43b a cutting edge 43a. As before note, bottom section 40a has a channel 47a in which protuberance 48a has limited vertical travel.

Fitted into top mold support 28a is anvil 100.

Figure 4:
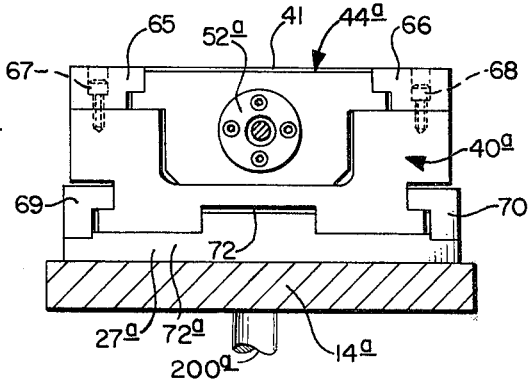
FIG. 4 is a sectional view taken along line 4—4 of FIG. 2.

FIG. 4 illustrates the assemblies utilized in this embodiment to help support bottom mold component 40a and tail-gripper 44a to prevent their falling away from side mold support 14a. Tail-gripper 44a is held in slidable contact with bottom mold section 40a by lugs 66 and 65, which lugs are rigidly attached to bottom mold sections 40a by bolts 68 and 67. Bottom mold section 40a is held in slidable contact by bottom mold section holding lugs 70 and 69 which are attached to bottom mold support 27a. Bottom mold lugs 70 and 69 are rigidly attached to bottom mold support 27a, which attachment may be achieved by welding, as is shown in the drawings, or by bolting, not shown. Bottom mold guiding channel 72 cooperates with ridge 72a on bottom mold support 27a to aid in maintaining proper alignment of bottom mold section 40a as it travels upwardly and downwardly.

Figures 5, 6:
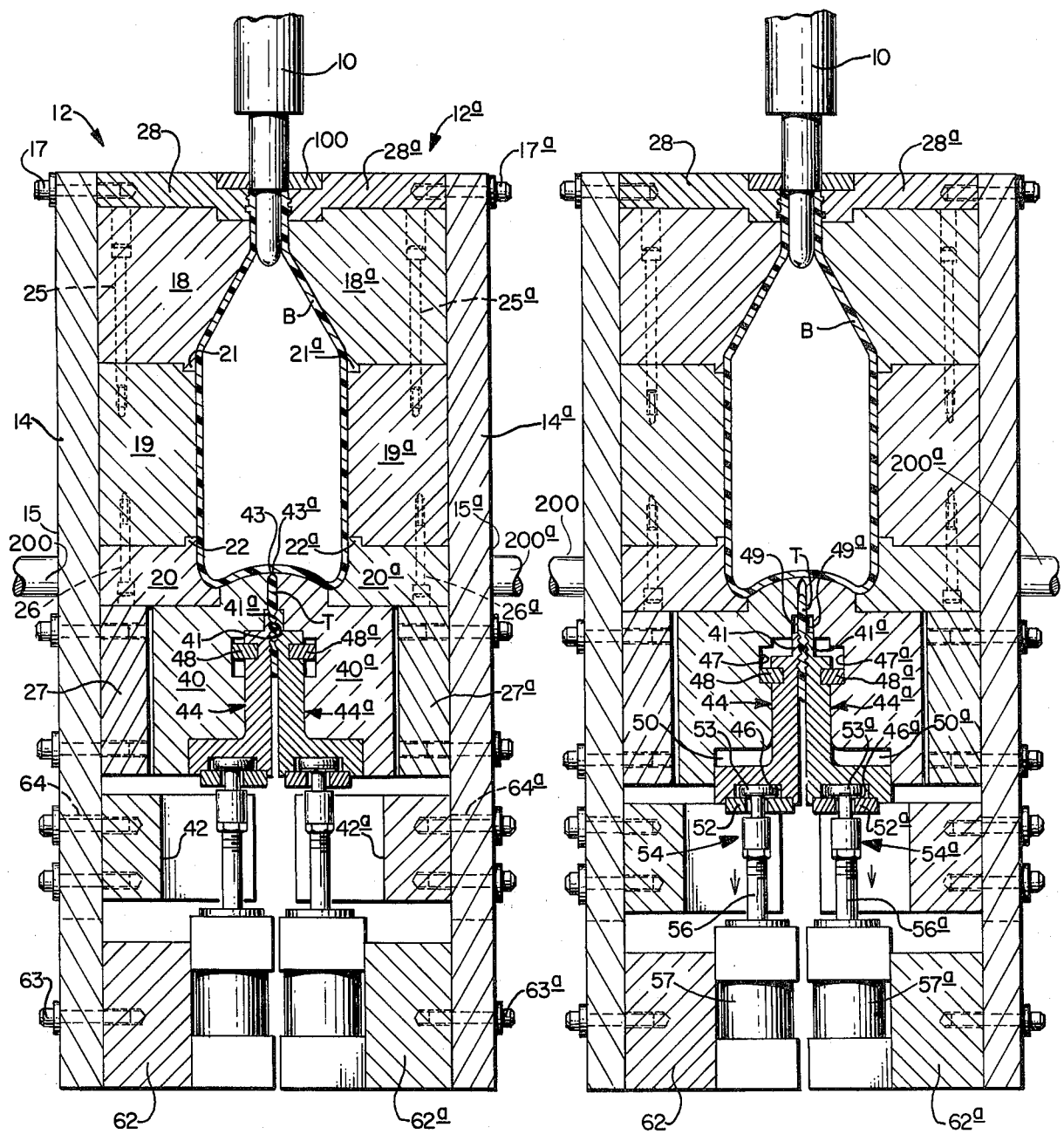

Referring now to FIGS. 5–8 there is shown, in partial section, the various operating positions of the components of the illustrated embodiment during the blow molding operation. FIG. 5 depicts the position of the apparatus after the plastic parison has been extruded and the bottle B has been blown to conform to the mold cavity (half the mold cavity 13a is shown in FIGS. 2 and 3). It should be noted that the tail T has been partially severed by cutting edges 43 and 43a and has been gripped by serrated edges 41 and 41a. Bottom mold sections 40 and 40a are in their uppermost position as are the tail-grippers 44 and 44a.

FIG. 6 illustrates the next position in which tail T is being pulled from the bottom of the bottle B. Protuberances 48 and 48a have traveled down within channels 47 and 47a and have contacted the lower extent thereof. Downward movement of tail-grippers 44 and 44a is achieved by the utilization of double reciprocating hydraulic cylinders 57 and 57a. The downward force of these cylinders is transmitted to tail grippers 44 and 44a by connecting rods 56 and 56a respectively.

Figure 7:
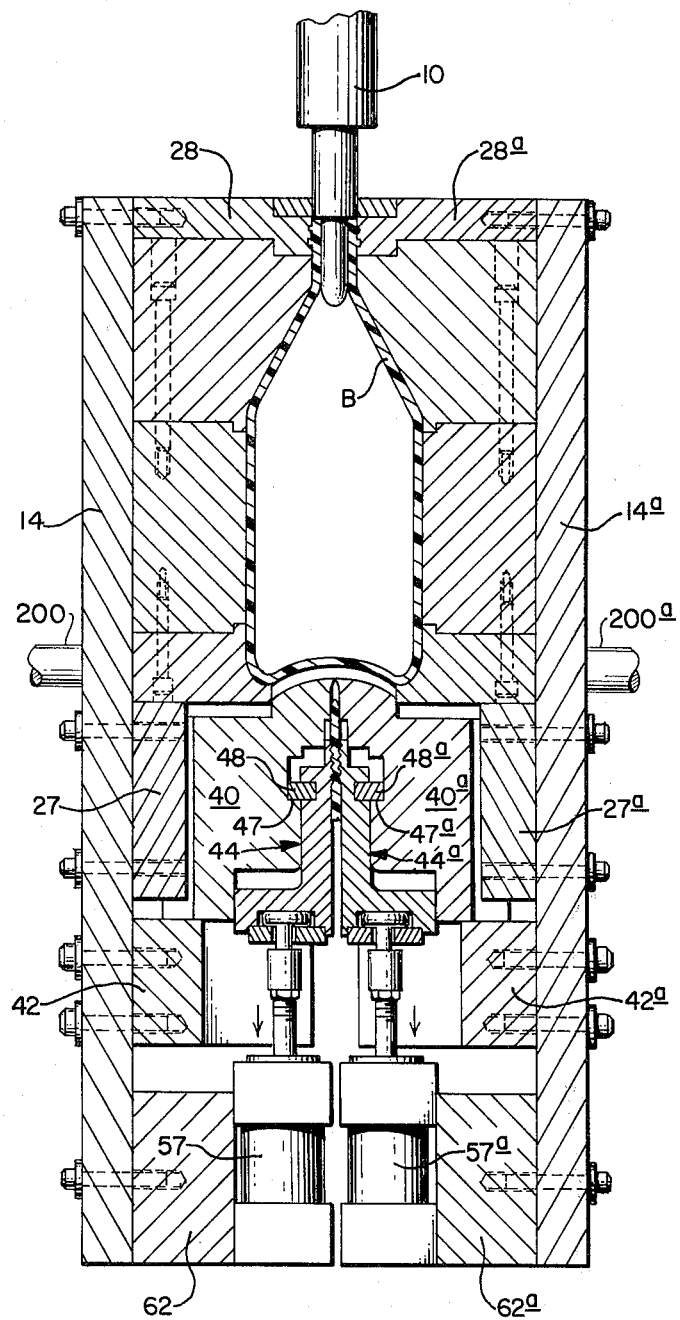
FIGS. 5, 6, 7 and 8 are partial sectional views showing the operation of the embodiment shown in FIGS. 1–4.

FIG. 7 depicts the next position during the procedure. In this position tail-grippers 44 and 44a are pulled down further bringing with them, due to contact of protuberances 48 and 48a, with the outer extent of channels 47 and 47a, bottom mold sections 40 and 40a. This movement results in the bottom mold sections being pulled away from the base of bottle B. Bottom mold sections 40 and 40a abut bottom mold stops 42 and 42a to prevent any further unnecessary downward motion of the sections and the tail-grippers.

Figure 8:
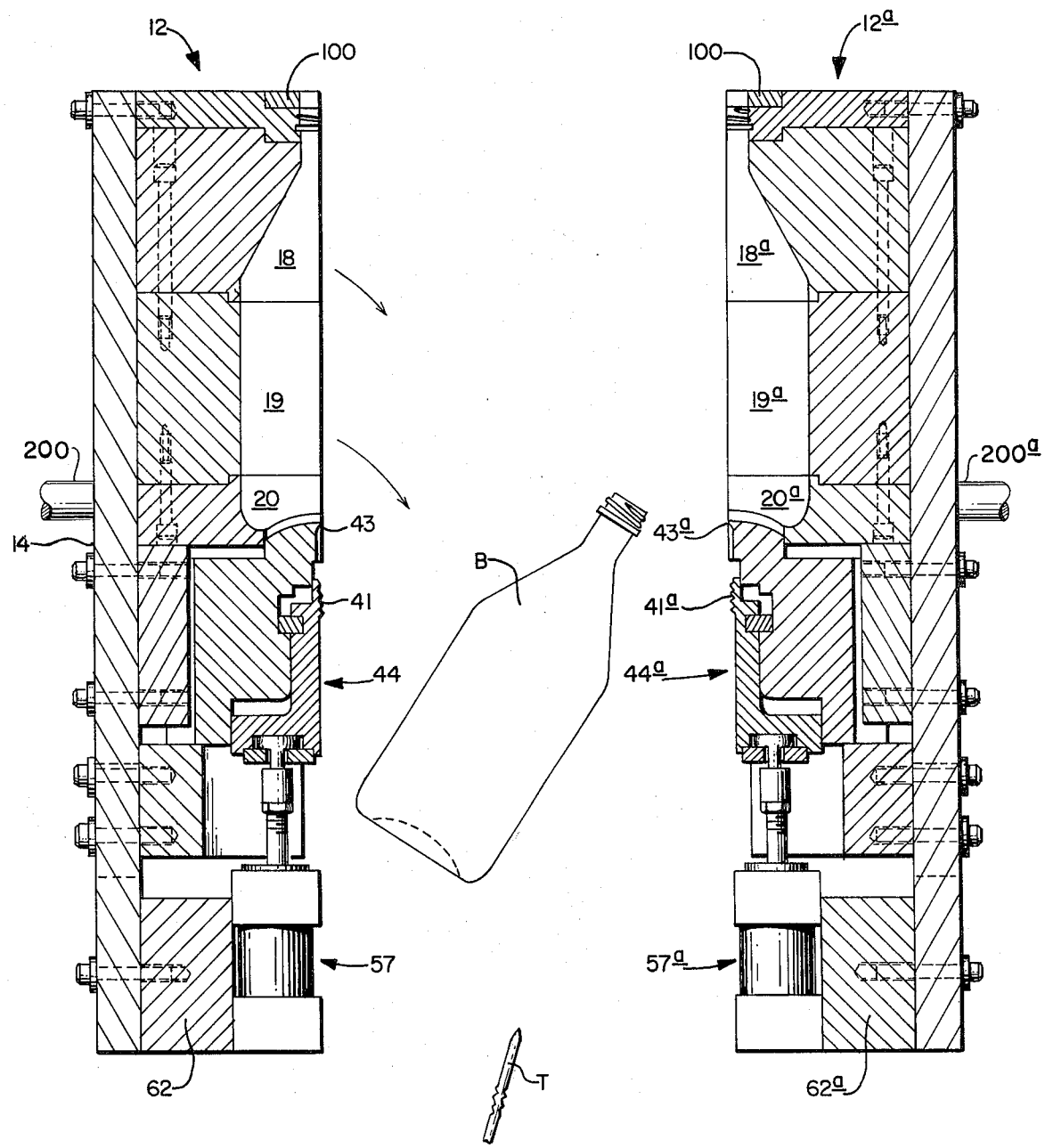

FIG. 8 depicts the final position in which the tailless bottle is removed from the apparatus. In this position mold halves 12 and 12a are moved apart from each other. By being so moved, and due to removal of bottom support from bottle B, bottle B falls from the mold halves due to gravity. Tail T is released from the tail-gripper and is discarded.

From the foregoing, it can be seen that the apparatus of the present invention provides a system for producing hollow plastic containers made from thermoplastic materials, for example materials such as polyethylene, polypropylene and polyvinyl chloride, wherein the base of the container is completely finished within the mold during the blow molding step.

There has been described what is considered preferred embodiments for practicing the present invention; however, it will be understood that other methods and apparatuses may be utilized for carrying out the invention. The invention is to be limited solely by the claims.

I claim:

1. An apparatus for blow molding hollow, plastic articles from tubular plastic parisons which includes:

a. a split blow mold having two halves and a center axis, each half having a top mold component and a bottom mold component, said bottom mold component being movable along said center axis;

b. two individual mold support means holding each individual mold half;

c. power means connected to each support means to move each individual support means and each associated mold half in a direction substantially perpendicular to said center axis whereby said split blow mold can be opened and closed;

d. tail-gripping means having two opposed halves, each half being held by one of said mold support means and said tail-gripping means being movable along the center axis of said article;

e. cooperating engaging means on said tail-gripping means and on said bottom mold component halves; and f. second power means coupled to said tail-gripping means to first move said tail-gripping means along said center axis and subsequently to move said tail-gripping means into engagement with said bottom mold component halves to move said mold component halves along said center axis whereby a tail is removed from said article by said first movement and whereby said subsequent movement facilitates removal of said article from said mold halves when said mold is opened.

2. The apparatus of claim 1 wherein said bottom mold components together form a convex molding surface to impart a concave shape to the bottom of said article and each of said bottom mold components is engagable with the bottom portion of said top mold components so that upward motion of said bottom mold components along said center axis is restricted.

3. The apparatus of claim 1 wherein below said bottom mold components are stopping means attached to each said mold support means for restricting the downward motion along said center axis of said bottom mold components.

4. The apparatus of claim 1 wherein said bottom mold components together form a convex molding surface to impart a concave shape to the bottom of said article and each of said bottom mold components is engagable with the bottom portion of said top mold components so that upward motion of said bottom mold components along said center axis is restricted and wherein each of the tail-gripping means is L-shaped, with the outside face of the verticle leg of said tail-gripping means having a serrated gripping surface and said horizontal leg of said tail-gripping means being attached to said second power means.

5. The apparatus of claim 4 wherein said engaging means on said tail-gripping means is a horizontally extending protuberance mounted on the inside surface of the vertical leg of said tail-gripping means and said engaging means on said bottom mold component halves is a channel into which said protuberances are slidily movable whereby movement of said tail-gripping means engages said gripping means with said bottom mold component halves for movement of said halves when said protuberances have moved to the outer extent of said channels.

6. The apparatus of claim 5 wherein the horizontal legs of said tail-gripping means fit flush within accommodating recesses in the bottom portions of said bottom mold component halves when said tail-gripping means is moved to its uppermost extent.

7. The apparatus of claim 6 wherein beneath said bottom mold component halves and attached to each of said mold support means are stopping means for restricting the downward motion of said bottom mold component halves.

8. The apparatus of claim 7 wherein guide means are attached to said mold support means for guiding said bottom mold component halves upon their upward and downward travel.

9. An apparatus for blow molding hollow, plastic articles from tubular plastic parisons which includes:

a. a split blow mold having two halves and a center axis, each half having a top mold component and a bottom mold component, said bottom mold component being movable along said center axis;

b. two individual mold support means holding each individual mold half;

c. power means connected to each support means to move each individual support means and each associated mold half in a direction substantially perpendicular to said center axis whereby said split blow mold can be opened and closed;

d. tail-gripping means having two opposed halves, each half being held by one of said mold support means, said tail-gripping means being movable along the center axis of said article and each of said tail-gripping means being generally L-shaped, with the outside face of the vertical leg of said tail-gripping means having a serrated gripping surface and said horizontal leg of said tail-gripping means being attached to said second power means;

e. cooperating engaging means on said tail-gripping means and on said bottom mold components halves; and f. second power means coupled to said tail-gripping means to first move said tail-gripping means along said center axis and subsequently to move said tail-gripping means into engagement with said bottom mold component halves to move said mold component halves along said center axis whereby a tail is removed from said article by said first movement and whereby said subsequent movement facilitates removal of said article from said mold halves when said mold is opened.

* * * * *